（12）United States Patent
Merciu

(10) Patent No.: US 10,481,289 B2
(45) Date of Patent: Nov. 19, 2019

(54) LOGGING SYSTEM AND METHOD FOR EVALUATION OF DOWNHOLE INSTALLATION

(71) Applicant: STATOIL PETROLEUM AS, Stavanger (NO)

(72) Inventor: Ioan-Alexandru Merciu, Hommelvik (NO)

(73) Assignee: STATOIL PETROLEUM AS, Stavanger (NO)

( * ) Notice: Subject to any disclaimer, the term of this patent is extended or adjusted under 35 U.S.C. 154(b) by 262 days.

(21) Appl. No.: 15/539,308

(22) PCT Filed: Dec. 21, 2015

(86) PCT No.: PCT/NO2015/050257
§ 371 (c)(1),
(2) Date: Jun. 23, 2017

(87) PCT Pub. No.: WO2016/105208
PCT Pub. Date: Jun. 30, 2016

(65) Prior Publication Data
US 2017/0350999 A1    Dec. 7, 2017

(30) Foreign Application Priority Data

Dec. 24, 2014 (GB) .................................. 1423176.5
Dec. 24, 2014 (GB) .................................. 1423177.3
May 5, 2015 (GB) .................................. 1507670.6

(51) Int. Cl.
*G01V 1/50* (2006.01)
*E21B 47/00* (2012.01)
(Continued)

(52) U.S. Cl.
CPC ................ *G01V 1/50* (2013.01); *E21B 47/00* (2013.01); *E21B 47/0005* (2013.01); *G01V 1/44* (2013.01);
(Continued)

(58) Field of Classification Search
CPC ... G01V 1/50; G01V 1/44; G01V 1/48; G01V 2210/1429; G01V 2210/1299; E21B 47/00; E21B 47/0005; E21B 33/14
See application file for complete search history.

(56) References Cited

U.S. PATENT DOCUMENTS 2,538,114 A    1/1951 Mason
3,401,773 A    9/1968 Synnott, III
(Continued)

FOREIGN PATENT DOCUMENTS

EP    1 275 983    1/2003
EP    1 505 252    2/2005
(Continued)

OTHER PUBLICATIONS

International Search Report dated Mar. 22, 2016 issued in International Patent Application No. PCT/NO2015/050257.
(Continued)

*Primary Examiner* — Daniel Pihulic
(74) *Attorney, Agent, or Firm* — Wenderoth, Lind & Ponack, L.L.P.

(57) ABSTRACT

A downhole installation comprises: a first pipe layer 8, a second pipe layer 10 about the first pipe layer 8, an annulus 12 between the first pipe layer 8 and the second pipe layer, and a geological formation outside of the second pipe layer 10. A logging system for evaluation of the downhole installation comprises: a logging tool 4 including an angled acoustic transmitter 20 for exciting a flexural wave in the first pipe layer 8, and three or more 10 angled acoustic
(Continued)

receivers 14, 16, 38, 40, 42 spaced apart along the tool 4 such that, in use, the receivers are at different locations along the length of the pipe layers 8, 10, the receivers 4, 16, 38, 40, 42 each being for obtaining third interface echo data from the second pipe layer 10; and a processor arranged to process acoustic data from the receivers in order to: identify trends in the amplitude of the third interface echo as it propagates along the length of 1 the pipes, calculate an estimated exponential decay for the third interface echo when reinforcement from other acoustic energy is disregarded, use this estimation to predict if the material behind the second pipe layer 10 is fluid or solid, and analyze the third interface echo data in light of the determined material state in order to thereby evaluate material conditions in the annulus 12 outside the second pipe layer 10.

15 Claims, 12 Drawing Sheets

(51) Int. Cl.
E21B 33/14 (2006.01)
G01V 1/44 (2006.01)
G01V 1/48 (2006.01)
(52) U.S. Cl.
CPC ............... *G01V 1/48* (2013.01); *E21B 33/14* (2013.01); *G01V 2210/1299* (2013.01); *G01V 2210/1429* (2013.01)

(56) References Cited

U.S. PATENT DOCUMENTS

| 4,255,798 | A | 3/1981 | Havira |
| 4,896,303 | A | 1/1990 | Leslie et al. |
| 6,018,496 | A | 1/2000 | Stanke et al. |
| 6,483,777 | B1 | 11/2002 | Zeroug |
| 7,149,146 | B2 | 12/2006 | Kuijk et al. |
| 2006/0133205 | A1 | 6/2006 | Van Kuijk et al. |
| 2006/0198243 | A1 | 9/2006 | Tang et al. |
| 2006/0233048 | A1 | 10/2006 | Froelich et al. |
| 2007/0131417 | A1 | 6/2007 | Bolshakov et al. |
| 2012/0120761 | A1 | 5/2012 | Vu et al. |
| 2014/0056101 | A1 | 2/2014 | Vu et al. |
| 2014/0177389 | A1 | 6/2014 | Bolshakov et al. |
| 2015/0219780 | A1 | 8/2015 | Zeroug et al. |
| 2017/0350231 | A1* | 12/2017 | Merciu .................... G01V 1/50 |
| 2017/0350999 | A1* | 12/2017 | Merciu .................... E21B 47/00 |

FOREIGN PATENT DOCUMENTS

| EP | 1 047 935 | | 8/2005 | |
| GB | 201507670 | * | 6/2015 | ............. E21B 47/00 |
| GB | 2531836 A | * | 5/2016 | ............. E21B 47/00 |
| WO | 2014/140363 | | 9/2014 | |
| WO | WO-2016105208 A1 | * | 6/2016 | ............. E21B 47/00 |

OTHER PUBLICATIONS

Written Opinion of the International Searching Authority dated Mar. 22, 2016 issued in International Patent Application No. PCT/NO2015/050257.
UK—IPO Search Report dated May 1, 2015 issued in British Application No. GB 1423177.3.
UK—IPO Search Report dated May 1, 2015 issued in British Application No. GB 1423176.5.
UK—IPO Search Report dated Jul. 23, 2015 issued in British Application No. GB 1507670.6.
A. Timonin et al., "Microannulus and Cement Evaluation: Effectiveness of Cement Evaluation Using Sonic and Ultrasonic Technologies in Wells with Microannulus Between Casing and Cement Sheath" SPE Annual Caspian Technical Conference and Exhibition, Nov. 12-14, 2014, Astana, Kazakhstan, SPE 172309.
S. Zeroug et al. "Ultrasonic Leaky-Lamb Wave Imaging Through a Highly Contrasting Layer", 2003, Proceedings IEEE Ultrasonics symposium, vol. 1, p. 794-798.
R. van Kuijk et al., "A Novel Ultrasonic Cased-Hole Imager for Enhanced Cement Evaluation". International Petroleum Technology Conference, Nov. 21-23, 2005, Doha, Qatar. IPTC 10546.

* cited by examiner

LOGGING SYSTEM AND METHOD FOR EVALUATION OF DOWNHOLE INSTALLATION

The invention relates to a logging system and to a method for evaluation of a downhole installation. The invention may be used to assess the quality of the bond for sealing material around a downhole casing in an oil and/or gas installation.

In an oil and/or gas production installation cement, as a sealing material, is cast around a downhole casing for various reasons. Other sealing materials can also be found around a downhole casing, such as shale, barite or collapsed formation material. These materials can fall from the walls about the casing and hence form a packed layer. This can occur with or without associated cement layer.

A primary role of the cement is to seal the formation's pores, blocking the escape of formation fluids inside the well. The cement provides support to the casing, and also forms a barrier around the casing that, if well-bonded, will prevent fluid migration between different zones of the well. For example, it is desirable to prevent fluid (from all sources) from leaking to the surface outside of the casing. It is also desirable to isolate producing zones from water bearing zones and aquifers. Migration of hydrocarbons into aquifers results in a loss of otherwise valuable hydrocarbons and a risk of environmental damage. Water ingress into producing zones can decrease the value of production and could render a producing zone no longer commercially viable. Proper cement placement between the well casing and the formation is therefore highly important. As a consequence, techniques for evaluating the quality of the cement bond are also highly important.

Barrier layers are expected to have the following properties:
Impermeability.
Long term integrity.
Non-shrinking.
Ductile—(non brittle)—able to withstand mechanical loads/impact.
Resistance to chemicals/substances ($H_2S$, $CO_2$ and hydrocarbons).
Wetting, to ensure bonding to the tube/casing (typically steel).

In newer wells with cemented casings the barrier layer will be relatively new cement and there may be a relatively large amount of information available concerning the make-up and the extent of the barrier layer. In older wells the status of the material behind the casing may be completely unknown. The location of the cement might not be accurately recorded and the cement can be deteriorated. There may also be settled barites, shale, collapsed formation materials and so on, as well as mixtures of those materials.

Cement bond evaluation techniques are used to assess the barrier layers in order to derive qualitative or quantitative data regarding one or more of these properties. Typically it is required that the cement should be verified via cement bond log with two independent logging measurements/tools being used. Logging measurements should preferably provide azimuthal data enabling identification of 'channelling'. The cement bong log is a representation of the integrity of the cement job, and generally focusses on whether the cement is adhering solidly to the outside of the casing.

The log is typically obtained from one of a variety of sonic-type tools. A relatively basic evaluation technique uses the variations in amplitude of an acoustic signal traveling down the casing wall between a transmitter and receiver to determine the quality of cement bond on the exterior casing wall. The acoustic signal in this case is generated by the transmitter at a low frequency range (for example 8 to 35 kHz). An acoustic mode, for example, extensional or flexural mode, excited in the body of the casing will travel along and inside the body of the pipe and it will be more attenuated in the presence of cement, or other sealing material about the casing, than if the casing were uncemented. This measurement is largely qualitative, as there is no indication of azimuthal cement variations such as channelling, and as it is sensitive to the effect of a microannulus. Newer systems use higher frequency bandwidths, for example 100 to 700 Khz or over 1 MHz. These are sometimes called cement evaluation logs or ultrasonic evaluation. They can give detailed, 360-degree representations of the integrity of the cement job.

In the prior art various techniques are described that make use of two basic principles to obtain cement bond logs from tools within the casing. One technique, as described in U.S. Pat. No. 3,401,773, uses a logging tool with sonic transducers spaced apart along the extent of the casing. A first sonic transducer insonifies the casing with an acoustic wave that propagates along the casing. The characteristics of the wave along the casing are determined by the geometry of the casing and the elastic wave properties of the casing. A refracted wave is received by a second transducer. The received signal can be processed to determine the presence or absence of cement behind the casing by extracting a particular portion of the received signal. If a solid barrier material such as cement is in contact with the outer of the casing then the amplitude of the acoustic wave propagating along the casing is diminished by a relatively small amount and the energy of the extracted portion of the received signal is relatively small. On the other hand, if a liquid is in contact with the casing, indicating an absence of a barrier material or a poor adhesion of the cement leading to a cavity that can be filled by liquid, then the amplitude of the acoustic wave is far less diminished and the extracted portion of the received signal has a correspondingly increased energy. This is a 'shear coupling' type phenomena. The guided mode energy inside the body of the pipe will be affected in terms of relative energy by the shear coupling in the material behind the pipe. There are two types of acoustic body waves, one is called compressional the second is called share. The two modes exist together as long as the traveling media is solid, but the shear mode does not travel inside fluid environments (water, muds, air and so on).

This type of technique can therefore provide useful information concerning the presence or absence of the barrier material adjacent to an interface between the casing and the annulus. However, it is not sensitive to the size of the void between the barrier material and the casing, and may hence in some cases indicate that there is no barrier material when a material such as cement is present and there is a small spacing between the cement and the casing. Such a 'microannulus' can be acceptable as cement lining with a microannulus may still provide a hydraulic barrier, and therefore it is an advantage to be able to identify an acceptable microannulus as distinct from a larger, unacceptable, spacing.

In another known prior art technique, as described for example in U.S. Pat. Nos. 2,538,114 and 4,255,798, an ultrasonic pulse echo technique is used, whereby a single transducer mounted on a logging tool within the casing is used to insonify the casing at near normal incidence and receives reflected acoustic information. With this arrangement the transducer insonifies the casing in such a way as to prompt resonance across the thickness of the casing. A portion of the acoustic wave is transferred into the casing and reverberates between a first interface at the junction of fluid within the casing and the casing material, and a second interface formed between the casing and the annulus behind the casing. The level of energy loss for this acoustic wave at each reflection changes depending on the nature of the matter (e.g. cement or fluid) behind the casing. It is suggested that this technique can more accurately discriminate different cement bond conditions including identification of acceptable microannuli.

A further prior art technique makes use of angled transducers as shown in U.S. Pat. No. 6,483,777. The angle of the transducer is set to be larger than a shear wave critical angle of the interface between the fluid within the casing and the material of the casing. The transducer therefore excites a flexural wave in the casing by insonifying the casing with an excitation at an angle greater than the shear wave critical angle. This flexural wave propagates along within the casing and sheds energy to the fluid inside the casing and to the material behind the casing. The flexural wave is a shear wave which propagates well in the solid material of the casing, but does not propagate in fluid due to the different molecular conditions. A portion of the flexural wave energy is leaked outside of the casing in the form of a compressional wave, which can propagate within solid or fluid in the annulus of the material outside of the casing. This wave may be refracted or reflected at a third interface, which in U.S. Pat. No. 6,483,777 is an outer boundary of the annulus. An echo is generated at the third interface (the third interface echo, third interface echo) and consequently this method provides additional data concerning the material within the annulus. As a portion of the flexural wave energy leaks into the annulus and reflects/refracts back to the receiver on the tool then this method can obtain data providing information about the entirety of the matter within the annulus, i.e. over an entire distance separating the casing and the third interface. Essentially, it has been shown that the casing is made "transparent" allowing the logging tool to "see" beyond the casing to the material of the annulus.

EP 1505252 describes yet a further prior art logging tool. In this example the logging tool has a plurality of acoustic transducers including a transducer for insonifying the casing with an acoustic wave at an angle, a transducer for insonifying the casing with a wave at normal incidence, and a pair of transducers operated at an angle to receive reflected and refracted waves from the casing as well as from the third interface. The transducers are at different positions along the length of the casing. The device thus includes a flexural transmitting transducer, a pulse echo transducer and two transducers for receiving acoustics generated by the flexural wave, being a near flexural receiving transducer and a far flexural receiving transducer. This technique allows for a greater amount of information to be derived concerning the material in the annulus behind the casing.

An example of the type of tool described in EP 1505252 that can be obtained commercially is an IBC Isolation Scanner as provided by Schlumberger Limited. The use of this tool has been well developed by the industry.

However, there remain issues to address in relation to determination of conditions within a downhole installation, in particular when seeking to measure the condition of the cement, or other material within the annulus about the casing, when there is a sequence of concentric pipes, for example when a tubing has been installed within the casing. Current well integrity logging using ultrasonic and acoustic methods requires logging operations to be performed into a single layered pipe (i.e. target sealing material placed behind one casing wall) and not in dual casing or multiple casing environments.

There are three technologies that are believed to contain information about dual casing or multiple casing environments: Vertical Seismic Profile (VSP), Borehole Acoustic Reflection Surveys (BARS—full waveform sonic logging), and Isolation Scanner—cement bond logs—variable density logs (IBC—USI—CBL).

Some interest has been shown in the past towards evaluation of VSP signals in multiple layers pipes in order to detect formation seismic tops in check shot surveys. In general noisy VSP surveys inside cased hole environments are attributed to a lack of cement to pipe bonding, free pipes (no contact between pipes and surrounding formations) or multiple layer pipes. The presence of such layered media in between receiver and surface source generates a ringing noise and the first arrivals are hard to distinguish automatically by detection algorithms. Manual analysis is possible but gives rise to large errors. Methods for picking VSP first arrivals are known to exist but usually they are kept as trade secrets or they are too unstable to be trusted by industry.

In relation to BARS, since the 1990's new techniques for imaging fractures away from boreholes using sonic logs have been developed using seismic leveraged techniques applied to full waveforms recorded downhole by sonic tools with monopole and dipole transmitters with source bandwidth spanning from about 700 Hz up to around 35 kHz. The processing techniques have reached the peak of development in 2008 and this technique is used currently in open hole environments but it is considered to be a niche technology, with limited amount of expertise developed around the world.

IBC—USI—CBL represent well known logging techniques widely used for single pipe integrity evaluation, one example of which is found in EP 1505252. In basic form these techniques consist of recording waveforms in the ultrasound and sonic domain. The sonic signal is generated traditionally by a monopole source with central bandwidth spanning from 8 kHz to 35 kHz. The pressure impulse will hit the pipe wall at an angle and it produce an extensional guided wave within the pipe wall, radiating headwaves on both sides of the pipe wall. The wave within the pipe wall is a shear wave that will not propagate through fluid material. The headwaves are compressional waves that will propagate through solid and through fluid. The headwaves are recorded by hydrophones/receives placed different distances from source, typically at about 3 ft and about 5 ft. The amplitude of the first break arrival at the received signal, the attenuation and the full waveform is displayed on a log. Specific thresholds are applied to distinguish different material conditions outside of the pipe wall, and one can perform a qualitative nonazimuthal interpretation. Variations of methods exist including azimuthal mapping of attenuation. It has been suggested that this technique can evaluate cement integrity between two casing strings, but to date there has been no proposal of the use of this type of system to make an assessment of conditions outside of a second casing in a multiple casing system. The current invention seeks to address the need for such an assessment.

Viewed from a first aspect, the present invention provides a logging system for evaluation of a downhole installation, wherein the downhole installation comprises: a first pipe layer, a second pipe layer about the first pipe layer, an annulus between the first pipe layer and the second pipe layer, and a geological formation outside of the second pipe layer, the system comprising:

a logging tool including an angled acoustic transmitter for exciting a flexural wave in the first pipe layer, and three or more angled acoustic receivers spaced apart along the tool such that, in use, the receivers are at different locations along the length of the pipe layers, the receivers each being for obtaining third interface echo data from the second pipe layer; and a processor arranged to process acoustic data from the receivers in order to: identify trends in the amplitude of the third interface echo as it propagates along the length of the pipes, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

This system makes use of the known third interface echo phenomena and expands on this to allow for further information to be obtained about material conditions outside of the third interface. It has been found that the third interface echo, in the case of a two pipe layer system, is not necessarily a reflection as has been previously suggested. Instead it may be considered to be energy arising due to a headwave generated by a flexural wave inside the second pipe. As used herein, the term third interface echo denotes the third 'echo' (the third peak in amplitude received by a receiver) which appears as being received from a third interface counting from the source outward towards the formation. In the two pipe system of the first aspect, the first interface is the inside face of the first pipe layer, the second interface is the external face of the first pipe layer, the third interface is the internal face of the second pipe layer, the fourth interface is the external face of the second pipe layer, and the fifth interface is a subsequent formation boundary or possibly the internal face of a subsequent casing/pipe layer.

One reason for the use of the flexural wave is for light cements and foam cement evaluation. Those particular cements are used in complex wells, such as ultradeep high pressure and high temperature wells, because they are much stable. They have impedance characteristics below 3.9 MRayl, which is recognized as a critical impedance. The conventional vertical incidence ultrasonic will generate an extensional mode (balloon, A0) in the body of the pipe. This is an asymmetric mode of vibration. The impedance characteristics of the contact between the pipe and sealing material will be affected in terms of relative values and the light cement may look like fluids because there is not enough shear coupling.

By exciting shear mode/flexural or zeroth symmetric mode in the body of the pipe (like a belt vibration, S0), then there is a shear to pressure conversion in the material behind the pipe, so we are confident that attenuation of the shear is dictated by the pressure coupling and not shear coupling. The excitation of S0 (zeroth symmetric mode or flexural) in the first pipe layer enables the first pipe layer to act as a source of pressure/compressional waves (P waves). While the S0 travels along the body of the pipe it will continually "leak P" on both sides of the pipe.

The material conditions that are evaluated by the method may be cement bond log data, for example a determination of the nature of the bond of barrier material such as cement to the outer casing in an oil and gas wellbore. As explained in detail herein, the inventor has made the realisation that the third interface echo data by itself does not allow for assessment of the material conditions since there is a discontinuity that cannot be resolved without further knowledge of the material behind the second pipe layer. The inventor's investigations have shown that the third interface echo is reinforced by other reflections and echoes that occur in a multi-pipe system, and is at least partly arising as a 'leaked' compressional wave from a flexural wave excited in the second pipe layer. The existing tools and methodologies do not provide sufficient data to allow this reinforcement to be taken account of. This problem has been addressed by the addition of further receivers and the realisation that it is possible to 'cancel out' the amplification/focussing effect found in the prior art when more data is obtained, since after the initial increase in amplitude there is a decay pattern indicative of the exponential decay of the third interface echo. It will thus be understood that by the use of an increased number of receivers it is possible to obtain knowledge about the amplification effects of the third interface echo and to permit a more accurate characterisation of the second pipe layer.

In addition, it should be appreciated that provided the receivers are appropriately located and will provide third interface echo amplitudes from after the peak amplitude then just two receivers may be used. Hence, in a broader aspect, the invention provides a logging system for evaluation of a downhole installation, wherein the downhole installation comprises: a first pipe layer, a second pipe layer about the first pipe layer, an annulus between the first pipe layer and the second pipe layer, and a geological formation outside of the second pipe layer, the system comprising: a logging tool including an angled acoustic transmitter for exciting a flexural wave in the first pipe layer, and angled acoustic receivers spaced apart along the tool such that, in use, the receivers are at different locations along the length of the pipe layers, the acoustic receivers including at least two receivers spaced apart from the transmitter so as to be located beyond the location where a peak in third interface echo amplitude is expected, the receivers each being for obtaining third interface echo data from the second pipe layer; and a processor arranged to process acoustic data from the receivers in order to: identify trends in the amplitude of the third interface echo as it propagates along the length of the pipes, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

The features discussed below relate to the first aspect as well as to this broader aspect. It will be appreciated that although in theory a minimum of two receivers can be used, greater detail and more information is provided with a larger number of receivers, and hence there are advantages in having more than two receivers.

The processor may be arranged to identify trends in the amplitude of the third interface echo as it propagates along the length of the pipes by plotting the peaks in amplitude for the third interface echo received at each of the receivers, and fitting a curve to the peaks. When this is done, then one possible technique for calculating an estimated exponential decay for the third interface echo in which reinforcement from other acoustic energy is disregarded is to fit an exponential decay curve to the curve fitted to the peaks after the second peak, i.e. ignoring the first peak. This is an approximation but it will provide a reasonable interpretation. Another option is to fit an exponential decay curve to a curve fitted to the first and third peaks, and subsequent peaks if there are more than three receivers, i.e. ignoring the second peak. Again this is an approximation, but provides useful results. The predicted/estimated attenuation from the estimated exponential decay curve can be used to determine impedance data for the second pipe layer and material outside the second pipe layer, and this then allows the third interface echo data to be used to obtain more detailed information about the material conditions outside the second pipe layer.

The target annulus is typically the annulus outside of the second pipe layer, but it will be appreciated that the system could be used to also provide evaluation of installations with additional pipe layers, for example three or four pipe layers, where a target annulus is outside of these additional layers. The same process that leads to creation of a third interface echo for a two-pipe system will also generate higher order interface echoes for systems with more layers of pipe, and these echoes can be identified and analysed in a similar way to thereby 'see' through the second pipe layer to a third pipe layer, and so on.

The logging tool may include three or greater than three receivers and in some example embodiments the logging tool comprises five receivers or more than five receivers. Five receivers have been found to enable good characterisation of the attenuation of the third interface echo. More receivers might be advantageous if it is desired to extract more detailed information from higher order echoes.

It is preferred for the receivers to be equally spaced. For example, the receivers may be spaced apart by a distance in the range 5-15 cm, such as about 10 cm between each receiver and the next. The first receiver may be spaced from the source by the same distance or by a larger distance than the spacing between subsequent receivers. It is preferred for the first receiver to be spaced apart from the source by at least 10 cm, for example by 10-15 cm. In order to have two receivers spaced apart from the transmitter so as to be located beyond the location where a peak in third interface echo amplitude is expected it is preferred to have one receiver located at least 15 cm from the transmitter, and one receiver located at least 20 cm from the transmitter. There may be a receiver spaced 15-25 cm from the transmitter and a receiver spaced 20-30 cm from the transmitter, with a 5-10 cm gap between these two receivers.

It should be noted that the source and receivers may be arranged on a logging tool with a single part and single housing, or the logging tool may be effectively split into two parts with the source and receivers on separate parts. A second logging tool or the same logging tool may include an acoustic source, or sources, for full borehole acoustic mode measurement. This can provide additional useful data for evaluation of the downhole installation.

The invention extends to a downhole installation equipped with the system. The system may be a cement bond evaluation system for a downhole installation, and in this case the processor may be arranged to produce cement bond log data. In one example, the first pipe layer is a tubing within a second pipe layer in the form of a casing and the acoustic data is used to determine information about the material outside of the casing.

The logging tool may be arranged for deployment within the first pipe layer via wireline or via a logging whilst drilling (LWD) system.

The transmitters and receivers may be transducers. The logging tool may be arranged to rotate within the first pipe layer to thereby obtain multiple sets of readings at differing azimuthal angles for each depth. Optionally the tool may include a pulse echo transducer arranged to insonify the first pipe layer with near normal incidence. This can enable the tool to obtain additional data concerning the annulus between the first pipe layer and the second pipe layer.

It will be appreciated that the processing of the acoustic data may be carried out at a different time and in a different place to obtaining the acoustic data. Thus, the system may include a logging tool for use in a first location and/or at a first time, and a processor for use in a second, different location and/or at a second, different time. The processor may be located onboard the logging tool, or it may be located remotely, for example it may be a processor above ground close to or remote from the downhole installation/logging tool.

In a second aspect, the invention provides a method of evaluation of a downhole installation, wherein the downhole installation comprises: a first pipe layer, a second pipe layer about the first pipe layer, an annulus between the first pipe layer and the second pipe layer, and a geological formation outside of the second pipe layer, the method comprising:

exciting a flexural wave in the first pipe layer using an angled acoustic transmitter;

receiving third interface echo data using angled acoustic receivers at different locations along the longitudinal extent of the pipe layers, the acoustic receivers including at least two receivers spaced apart from the transmitter so as to be located beyond the location where a peak in third interface echo amplitude is expected;

processing the received acoustic data in order to: identify trends in the amplitude of the third interface echo as it propagates along the length of the pipes, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

As with the system above, this method could be used to also provide evaluation of installations with additional pipe layers, for example three or four pipe layers, where a target annulus is outside of these additional layers.

The method may include the use of a logging tool as described in the first aspect and any or all preferred and optional features set out above. Thus, three or greater than three receivers may be used to receive the third interface echo data and in some example embodiments five receivers or more than five receivers are used.

The method may include determining the expected location for the peak in third interface echo amplitude based on simulations and/or experimental data, and placing the angle acoustic receivers based on the determined expected location. As will be appreciated by those skilled in this field, the required location may differ depending on the characteristics of the downhole installation, but the location can be readily determined in accordance with the teaching herein by use of simulations of the downhole installation and/or based on experiments in the downhole installation or a similar downhole installation. The experiments might include previous readings obtained using the same or a similar set of acoustic receivers, and/or trial and error testing to find the peak in third interface echo amplitude.

The processing step may include identifying trends in the amplitude of the third interface echo as it propagates along the length of the pipes by plotting the peaks in amplitude for the third interface echo received at each of the receivers, and fitting a curve to the peaks. When this is done, then calculating an estimated exponential decay for the third interface echo in which reinforcement from other acoustic energy is disregarded may be done by fitting an exponential decay curve to the curve fitted to the peaks after the second peak, i.e. ignoring the first peak. Alternatively, an exponential decay curve may be fitted to a curve fitted to the first and third peaks, and subsequent peaks if there are more than three receivers, i.e. ignoring the second peak.

The method may be a method of cement bond evaluation for a downhole installation. In one example, the first pipe layer is a tubing within a second pipe layer in the form of a casing and the acoustic data is used in the processing step in order to determine information about the material outside of the casing.

The method may be implemented by means of computer software for processing data obtained by a suitable logging tool or tools.

Thus, the invention extends in a further aspect to a computer programme product comprising instructions that, when executed, will configure a computer apparatus to implement a method comprising:

receiving acoustic data for a downhole installation that comprises: a first pipe layer, a second pipe layer about the first pipe layer, an annulus between the first pipe layer and the second pipe layer, and a geological formation outside of the second pipe layer; wherein the acoustic data comprises third interface echo data received by angled acoustic receivers at different locations along the longitudinal extent of the pipe layers, the acoustic receivers including at least two receivers spaced apart from the transmitter so as to be located beyond the location where a peak in third interface echo amplitude is expected; and processing the received acoustic data in order to: identify trends in the amplitude of the third interface echo as it propagates along the length of the pipes, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

The method implemented by the computer programme product may include any or all features as described above in relation to the method of the second aspect and its preferred features. The method may be a method of cement bond evaluation for a downhole installation.

Certain preferred embodiments of the invention will now be described by way of example only and with reference to the accompanying drawings in which.

Figure 1:
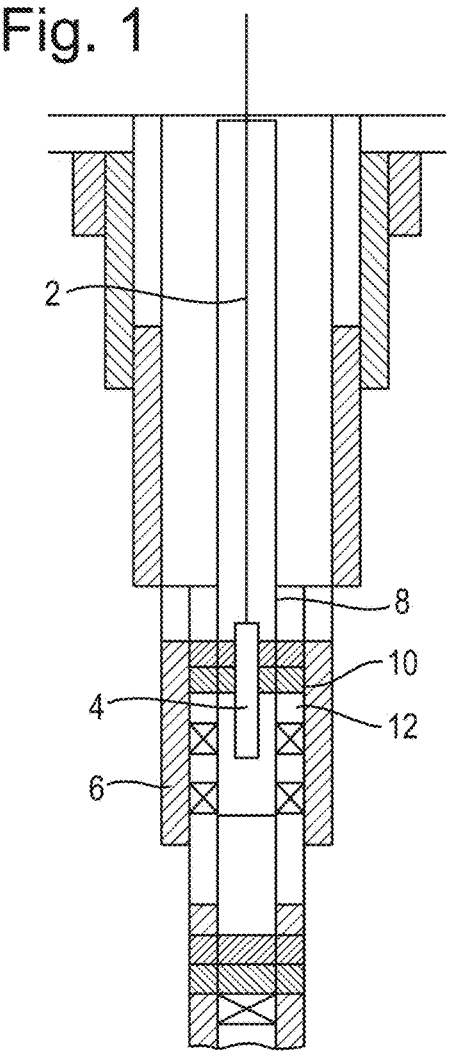
FIG. 1 shows a casing bond logging recording system in situ within a tubing.

A typical downhole installation is shown schematically in FIG. 1. The borehole extends from surface level down to a reservoir. Fluid is extracted from the reservoir through downhole tubing 8. The tubing 8 is held within a casing 10. An annulus 12 is formed between the tubing 8 and the casing 10. There is also another annulus 6 formed between the outside of the casing 10 and the formation, or optionally between the outside of the casing 10 and yet further casings. In this example we consider the simplest case of a tubing 8 within a casing 10. The interior of the tubing 8 and the annulus 12 between tubing 8 and casing 10 are filled with fluid, typically in the liquid phase. The annulus 6 between casing 10 and the formation may be filled with any type of material, such as cements, barite, drilling fluids and so on.

Figure 2:
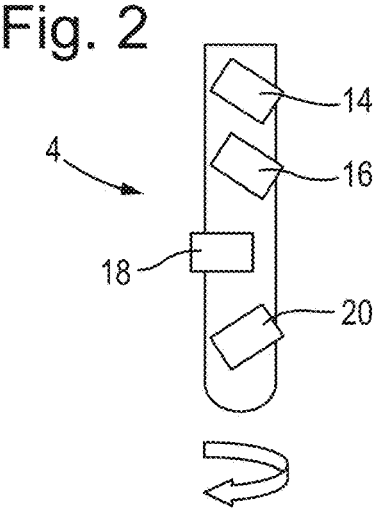
FIG. 2 illustrates details of a prior art wireline logging tool.

A wireline logging tool 4 is deployed inside the tubing. It is supported from above via a wireline logging cable 2. It will be appreciating that the logging tool 4 could also be deployed via a "logging while drilling" (LWD) system. The wireline logging tool 4 is shown in FIG. 2 in schematic form. The tool 4 is arranged for rotation about the vertical axis of the borehole as shown by the arrow at the base of the Figure. In its most basic form a suitable tool includes an angled transmitter transducer 20 for insonifying a flexural wave, a pulse echo transducer 18, a near flexural receiver transducer 16 and a far flexural receiver transducer 14. Thus, it will be understood that this tool could be broadly similar in terms of its structural features to the tool described in EP 1505252. The basic operation of the tool is already known, and could again be as described in this prior art reference, and therefore it will not be set forth in detail herein. The inventor proposes a new use of this type of tool, and similar tools, in order to evaluate the cement bond quality about a casing when the tool is located within a tubing inside the casing, or within other dual-casing or multiple-pipe installations. This provides a significant advance compared to known systems, since it means that the cement bond log can be obtained more cheaply and more easily.

It is accepted by industry that a third interface echo (TIE) can be obtained via a tool of the type shown in FIG. 2. Various prior art has shown the use of this phenomenon to obtain data about the material in an annulus outside of a casing, when the tool is within the casing. As explained above, it is believed that the third interface echo is not purely an echo as such and therefore it becomes possible to draw new conclusions about the second pipe layer, and the surrounding material. In the current proposal, as shown in FIG. 1, the tool may be within a tubing 8 that is itself within a casing 10. Here, it is desirable to be able to obtain information about the material in the annulus, and in particular to obtain cement bond logging information, by use of the tool to "see" through both of the tubing 8 and the casing 10.

It has been found via simulation that the full waveform obtained through methods such as USI, Oblique Incidence Ultrasonic logging and Sonic Borehole Acoustic Reflection Survey will include information about conditions outside of a second pipe layer such as the casing 10 in FIG. 1. FIGS. 3a to 3h show the simulated reaction of a double pipe layer system. The simulation uses pitch catch ultrasonic elements consisting of one transmitter with frequency bandwidth in the range of 80 to 500 kHz with maximum magnitude of impulse at 100 kHz or 175 kHz or 200 kHz or 250 kHz or 265 kHz or 300 kHz and two receivers for near and far capture of the resultant waveform. The simulation uses a model similar to the set-up described above for FIG. 1. In FIGS. 3a through 3h a half of the downhole installation is modelled and is shown in a section view cutting through the various pipe layers along a radius. The left-to-right direction in FIGS. 3a through 3h is an up and down direction as viewed in FIG. 1. The ultrasound transducers are similar to those shown in FIG. 2 and hence have the same reference numbers.

Thus, within a first pipe layer (such as tubing) 8 a tool is placed (not shown in full), the tool having an angled transmitter 20 along with a near flexural receiver 16 and a far flexural receiver 14. Outside of the first pipe layer 8 is a second pipe layer 10, and there is an annulus 12 between the first pipe layer 8 and second pipe layer 10. Outside of the second pipe layer 10 there is another annulus 6 and this has a boundary 22 formed for example by a formation boundary or by another pipe layer.

In the case of multiple pipe layers of this type the annulus 12 between the first pipe layer 8 and second pipe layer 10 will be filled with a fluid. When using oblique ultrasound incident through tubing logging in this situation it is found that the third interface echo is always visible, for the following reasons:
  a. The material in the annulus 12 behind the first pipe 8 is in the fluid state and hence readily transfers energy leaked from the flexural wave in the pipe material.
  b. The angle of the pipe layers 8, 10 relative to each other varies very little with distance even if the pipes are buckled. This means that for a logging measurement at a given depth the pipes 8, 10 can be considered as being parallel with each other, as shown in the model.
  c. The internal face of the second pipe layer 10 is smooth.

Figure 3A:
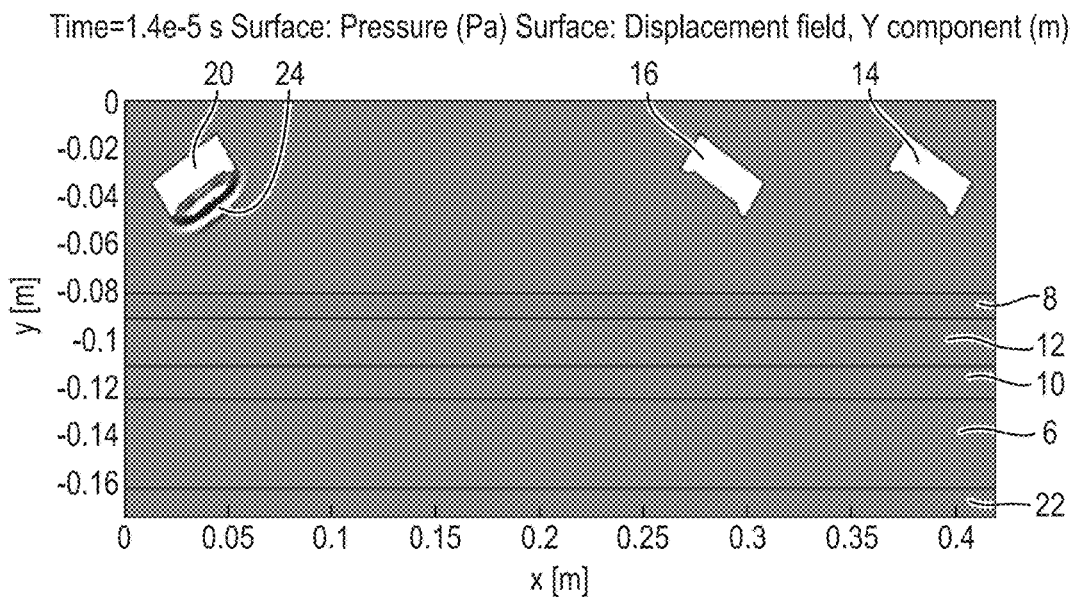
FIGS. 3a to 3h show a modelled dual-pipe system with simulated acoustic waves generating third interface echo data that is received by near and far receivers.

This means that the third interface echo can be utilised reliably for making an assessment of the condition of the annulus 6 behind the second pipe layer 10. The interaction of the acoustic signal from the transmitter 20 and the modelled multi-pipe system is shown in FIGS. 3a to 3h and proceeds as follows:

FIG. 3a: the model is 'at rest', and a pressure impulse 24 is generated by the transmitter 20. The pressure impulse 24 is directed at the first pipe layer 8 at an angle sufficient to generate a shear wave (flexural wave) in the material of the pipe layer 8.

Figure 3B:
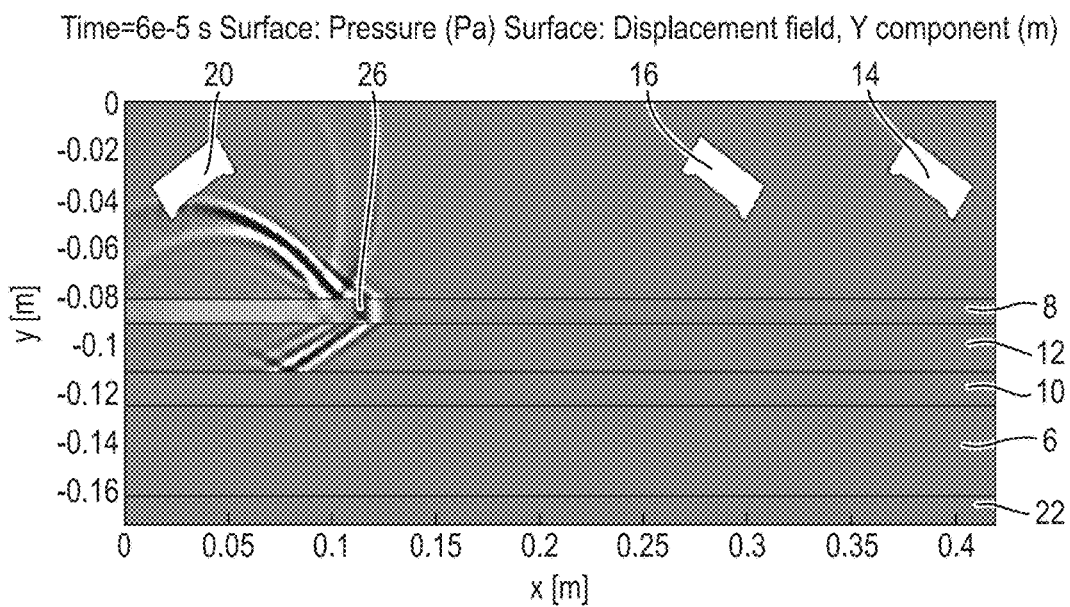

FIG. 3b: When the pressure impulse 24 reaches the first pipe 8 then a flexural wave 26 is excited in the body of the first pipe 8.

Figure 3C:
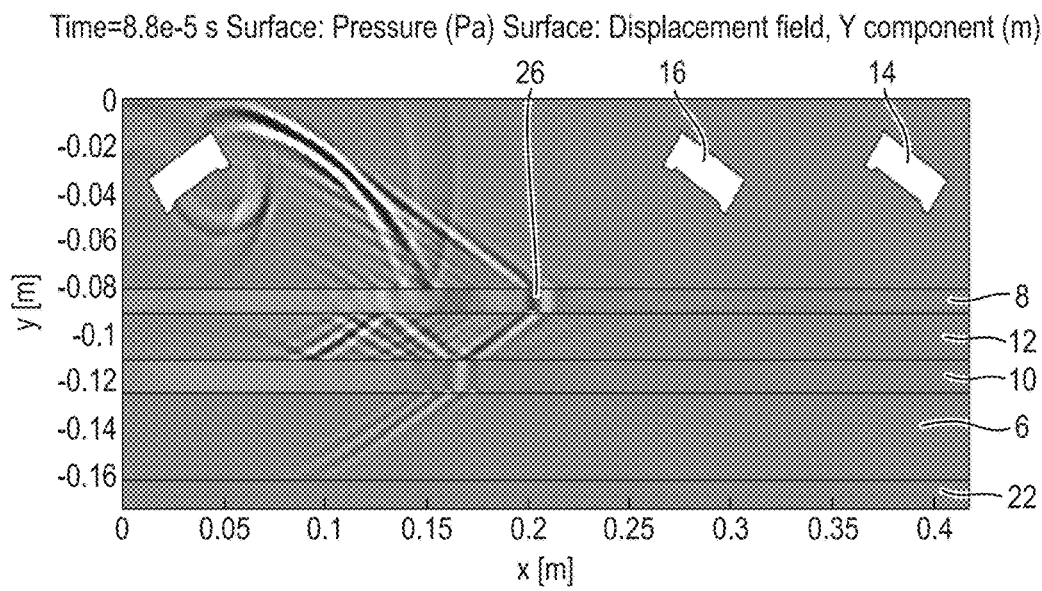

FIG. 3c: This flexural wave 26 is guided along the pipe wall and 'leaks' energy into the material within the first pipe 8 and into the material of the annulus 12 between the first pipe 8 and second pipe 10.

Figure 3D:
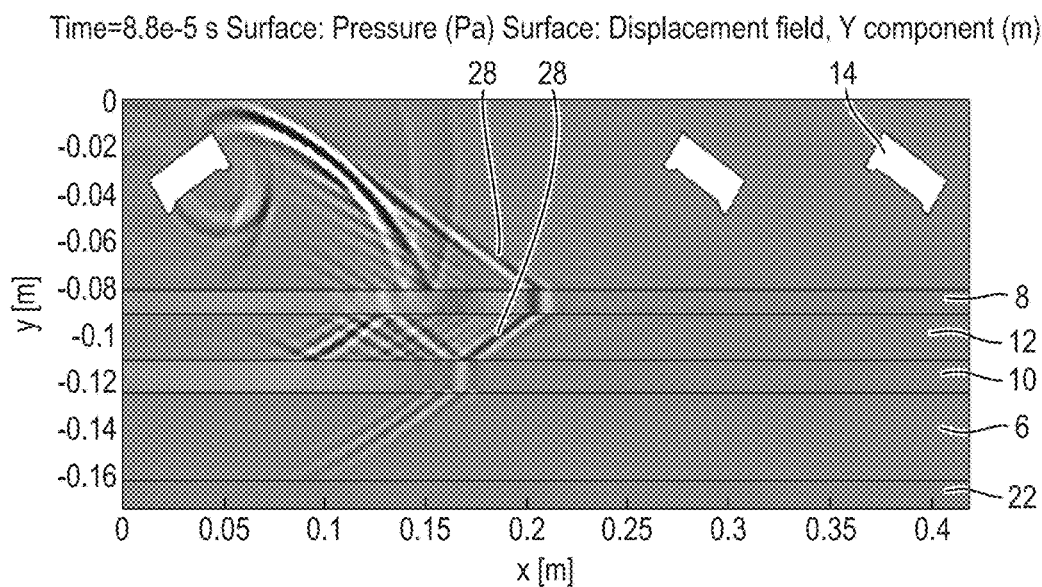

FIG. 3d: The leaked energy generates compressional planar impulse waves 28 ('headwaves') on both sides of the wall of the first pipe 8.

Figure 3E:
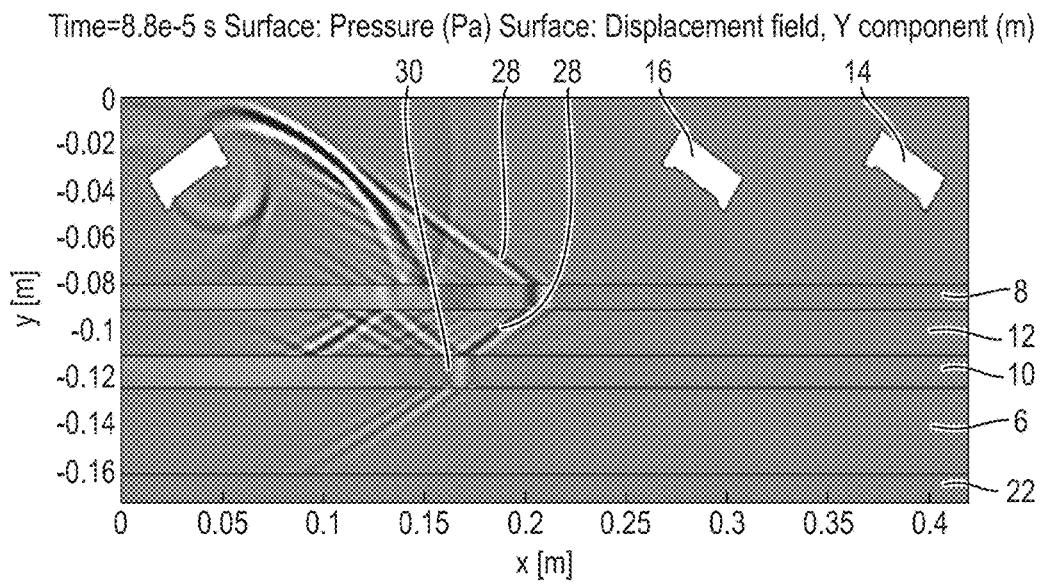

FIG. 3e: The angle of incidence of the compressional wave 28 on the second pipe layer 10 is similar to the angle of incidence of the initial excitation signal and hence is able to excite a second flexural wave 30 in the wall of the second pipe layer 10

Figure 3F:
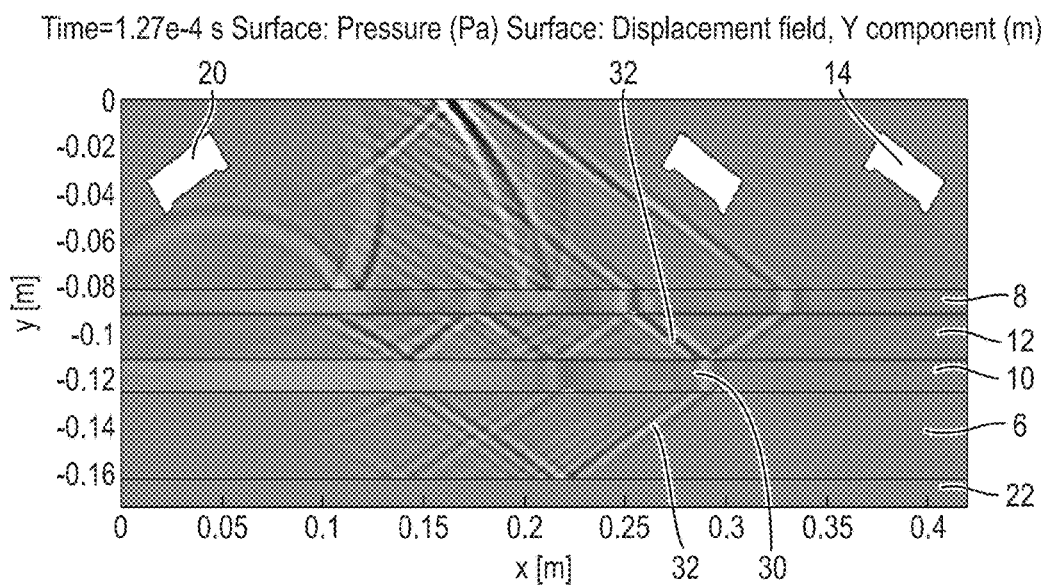

FIG. 3f: As the two flexural waves 26, 30 proceed along the pipe layers then second flexural wave 30 traveling inside the wall of the second pipe 10 will leak energy in similar way as the first flexural wave 26 and this produces a further set of compressional planar impulse waves 32 centred on the second pipe layer 10.

Figure 3G:
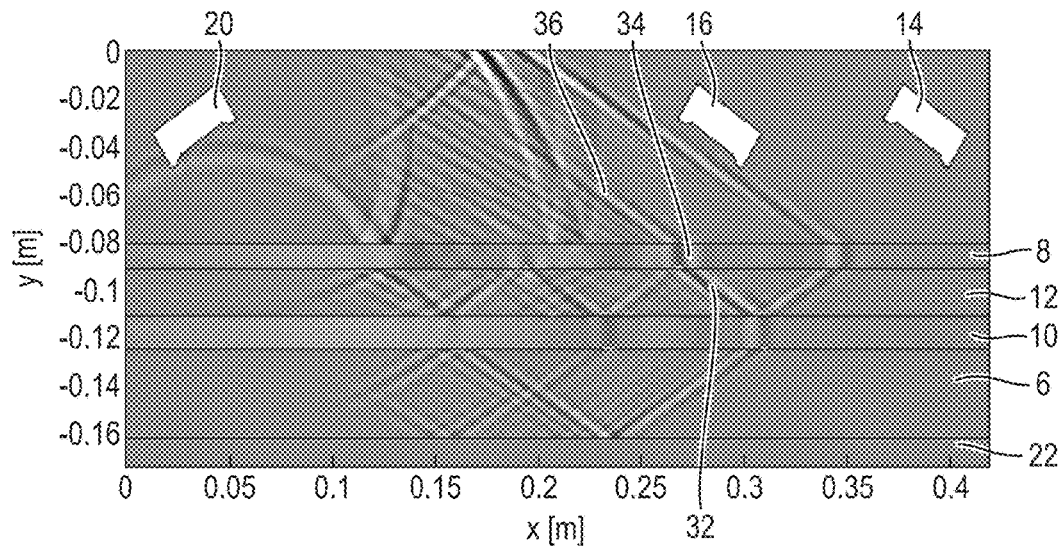

FIG. 3g: The further set of compressional planar impulse waves 32 includes a wave that passes through the annulus 12 back to the first pipe layer 8 and excites a third flexural wave 34 therein. This then leaks energy to produce additional compressional waves, of which the wave within the inner pipe forms the third interface echo 36.

Figure 3H:
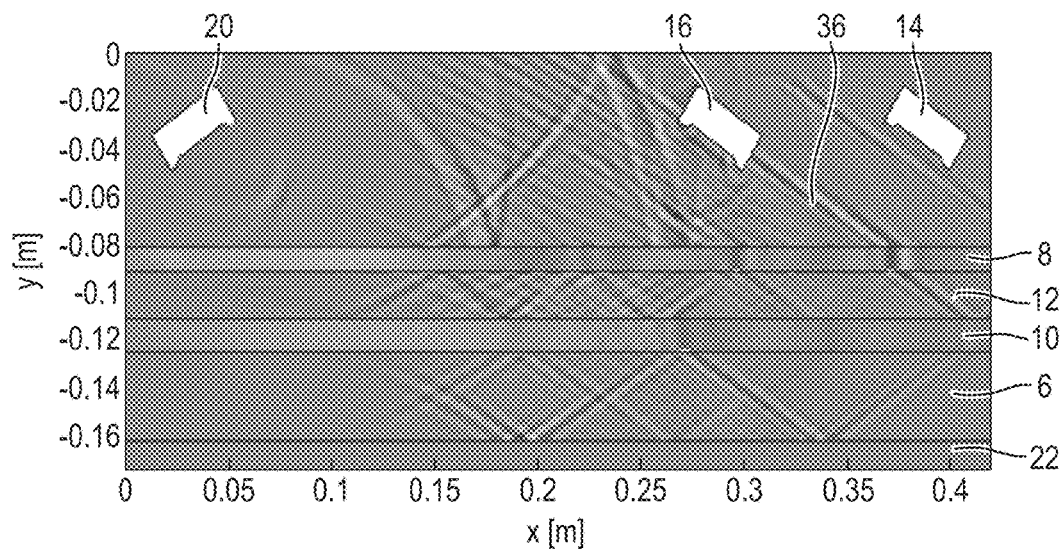

FIG. 3h: The third interface echo 36 will pass the near receiver 16 and then the far receiver 14, where it can be recorded as a part of the full wave form.

Figure 4:
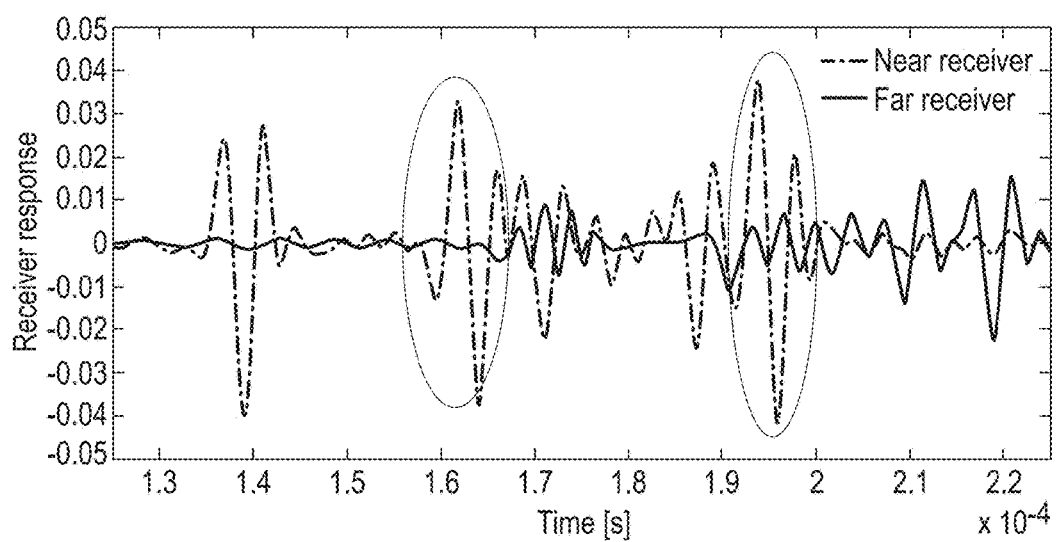
FIG. 4 is a graph of received acoustic amplitude at the near and far receivers of FIGS. 3a-3h.

The resultant waveform is shown in FIG. 4 with the readings from the near and far receivers overlaid. The near receiver sees the third interface echo 36 starting at about 0.16 ms on the time axis as shown by the first arrow. The far receiver sees the third interface echo 36 at about starting at about 0.19 ms on the time axis as shown by the second arrow. The amplitudes of the third interface echo plotted azimuthally will provide information about the material body of the second pipe layer 10 and the bonding status of the second pipe layer 10. Notably, and surprisingly, the amplitude of the third interface echo is larger at the far receiver than at the near receiver.

It is generally known that the material within the first pipe layer 8 and within the second pipe layer 10 (in the annulus 12) is in the fluid state. The material outside of the second pie layer 10 (in the annulus 6) could be fluid or solid. By considering the possibility of either a fluid material in the annulus 6 or a solid material in the annulus 6 then synthetic seismograms can be obtained. It is possible to extract the amplitudes of third interface echo at the far receiver 14 and near receiver 16, to calculate attenuation of the flexural mode inside the body of the second pipe layer 10 and to find distances in between pipes.

Figure 5:
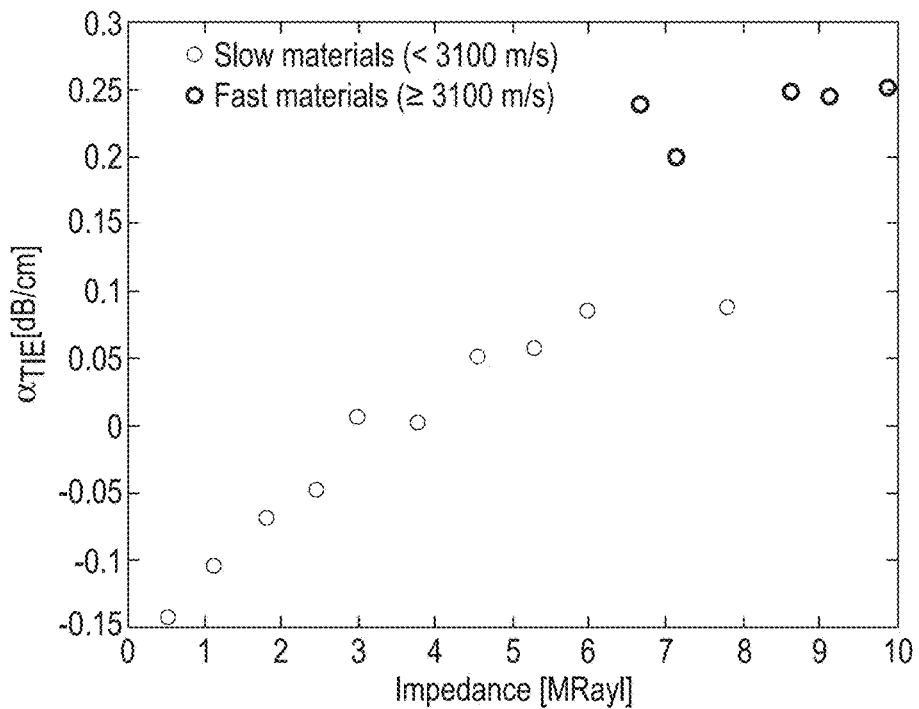
FIG. 5 shows attenuation of the flexural wave in the second pipe layer of FIGS. 3a-3h when the material behind the pipe is in the fluid state.
Figure 6:
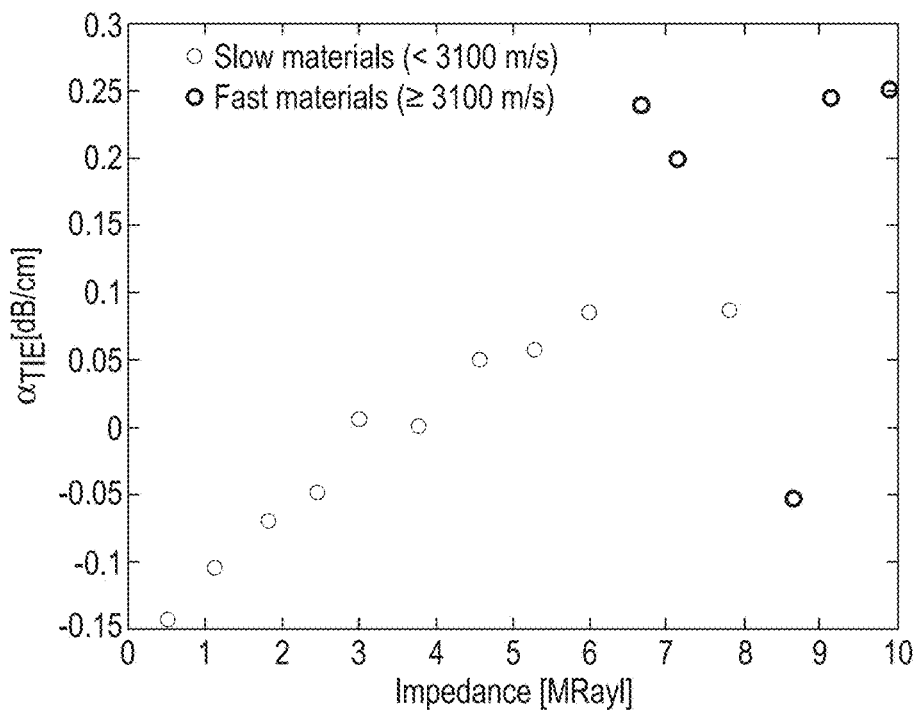
FIG. 6 shows attenuation of the flexural wave in the second pipe layer of FIGS. 3a-3h when the material behind the pipe is in the solid state.

FIG. 5 shows the attenuation of flexural mode in the second pipe layer 10 as function of impedance of material behind second pipe when the martial behind second pipe is in the fluid state and FIG. 6 shows the equivalent attenuation of flexural mode in the second pipe layer 10 as function of impedance of material behind second pipe when the martial behind second pipe is in the solid state. It will be seen that these Figures are similar, indicating that the attenuation does not provide a way to distinguish between solid and fluid materials.

Figure 7:
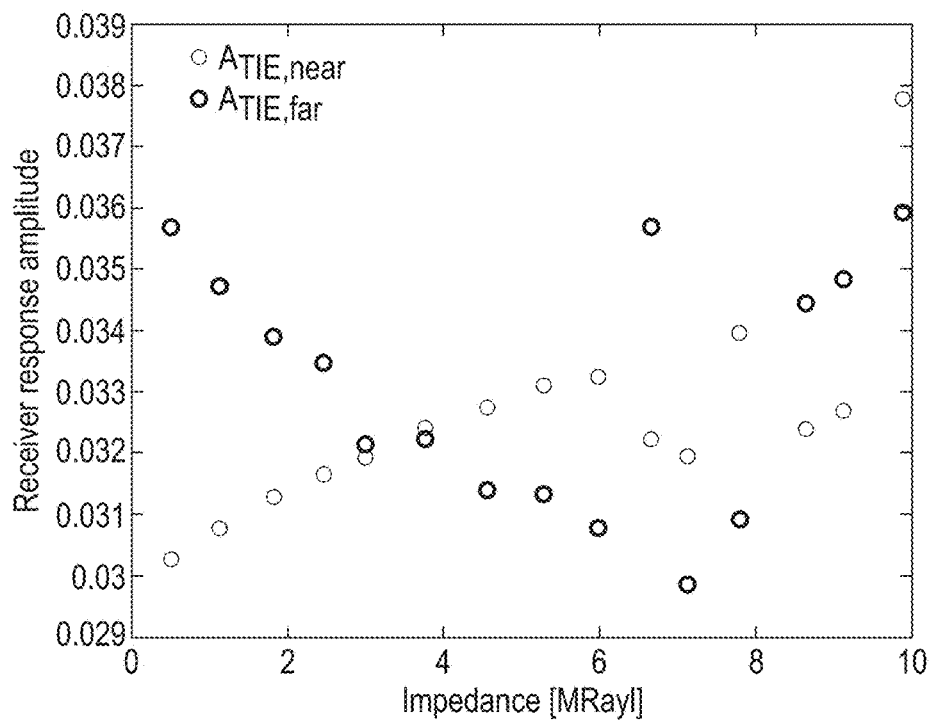
FIG. 7 is a plot of third interface echo amplitudes at the near and far receivers as a function of impedance of the material behind the second pipe for solid state material.
Figure 8:
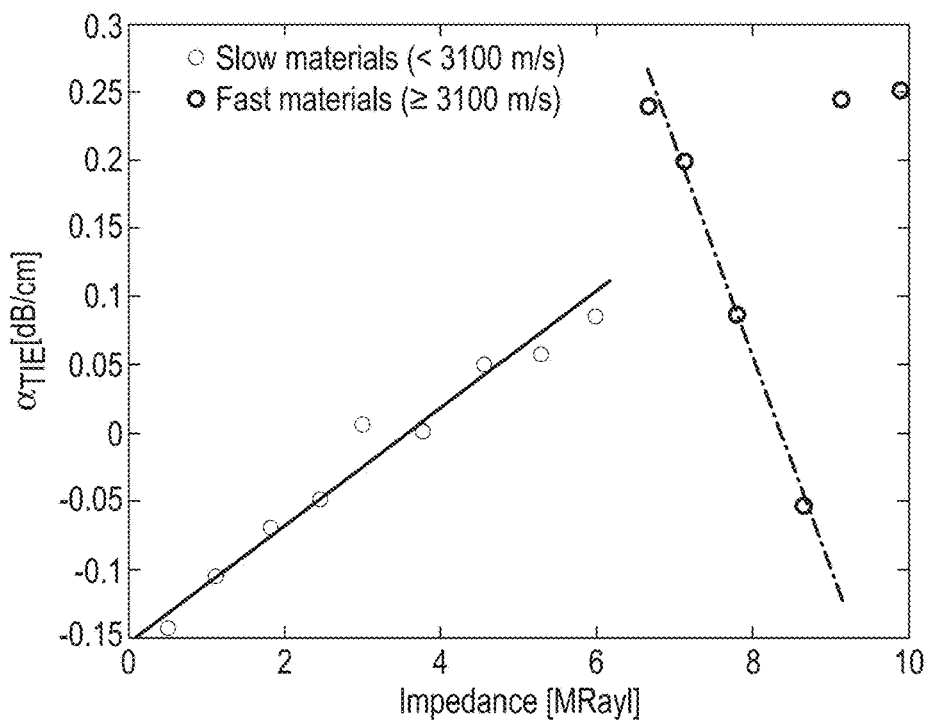
FIG. 8 illustrates the non-linear behaviour of third interface echo attenuation for the second pipe layer and shows a discontinuity.

More information is seen when the third interface echo amplitudes at the two receivers are plotted as function of the impedance of the material behind second pipe. FIG. 7 shows the results for this when the material behind second pipe is in the solid state. Considering FIG. 7 it will be observed that there is a crossing of the amplitude values at an impedance value of about 4 MRayl. This corresponds with transition of mode coupling behind the second pipe from dominant P mode coupling to dominant share mode coupling. FIG. 8 depicts the non-linear behaviour of the third interface echo amplitudes when plotted against impedance.

Hence, a problem arises. It is not known if the material in the annulus 6 beyond the second pipe layer 10 is fluid or solid and therefore it is not possible to determine what side of the discontinuity of FIG. 8 is relevant. In fact, part of the reason for investigating the information inherent in the third interface echo is to identify the properties of this material. Without knowledge of the material state it is impossible to define the impedance of the material behind the second pipe layer 10 by using only the headwaves generated by the flexural waves and the associated third interface echo amplitudes and third interface echo attenuation on the second pipe layer 10. This observation is the same observation as has previously been made for a single pipe bonding evaluation. In the case of a single pipe the situation can be resolved by an independent measure of impedance, such as the use of an ultrasonic pulse echo technique as discussed above. In order to make effective use of the third interface echo data discussed above to find information about material conditions beyond a second pipe layer additional measurements must be carried out in order to identify what side of the discontinuity of FIG. 8 should be considered for a given third interface echo based measurement, or at least to predict this with a high degree of confidence.

It will be understood from FIG. 4 above that there is an unexpected effect at the far receiver 14 in the prior art device. The amplitude of acoustic waves should decrease as they propagate further from the source 20, yet in this case they appear to increase. The focussing effect at the far receiver 14, if understood properly, can provide a way to extract more information from the third interface echo data.

The basic proposal for an improved tool is to introduce further angled receivers in order to allow for a more complete characterisation of the varying amplitude of the third interface echo. At least three receivers should be used, and in the example embodiment, as in FIG. 9 and described below, there are five receivers, with three extra receivers 38, 40, 42 in addition to the two receivers 14, 16 in the prior art. It has been found that the third interface echo does not display a simple exponential decay as occurs with the first echo and with other acoustic reflections. Instead, the third interface echo first exhibits an increase in amplitude, and then begins to show a decay. In order to characterise this variation in amplitude it is essential to have more than two angled receivers. In the example embodiment five receivers are used with equal spacing. This has been found to provide good results. There is of course a compromise between the complexity of the device and the information that is obtained. A larger or smaller number of receivers could be used.

Figure 9:
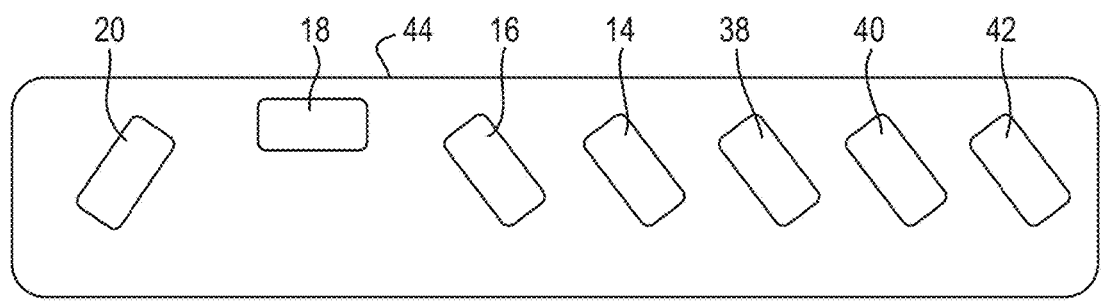
FIG. 9 shows an improved logging tool.

As shown in the schematic diagram of FIG. 9, the new tool is similar in its basic features to the prior art tool of FIG. 2, but it has an increased number of receivers. The five receivers 14, 16, 38, 40, 42 are placed at an equal spacing of 10 cm. In addition, the housing 44 of the tool are made of a composite material. This differs from current tools, which are built with metal frames. The transmitter 20 is an angled transmitter as with the current technology, and there can also be a pulse echo transducer 18 for vertical incidence excitation of the pipe wall as with the current technology (i.e. as in FIG. 2). It will be seen that the additional receivers 38, 40, 42 are placed in a manner similar to the near and far receivers 14, 16 of the FIG. 2 device, spaced apart further along the length of the tool so as to be spaced apart further along the length of the pipe when the tool is in use. The tool is suggested to be wireline but it will be appreciated that a logging while drilling (LWD) version could also be used. The wireline tool is arranged to rotate within the downhole installation in order that it can take azimuthal readings. Deployment of the tool is as shown in FIG. 1.

Figure 10:
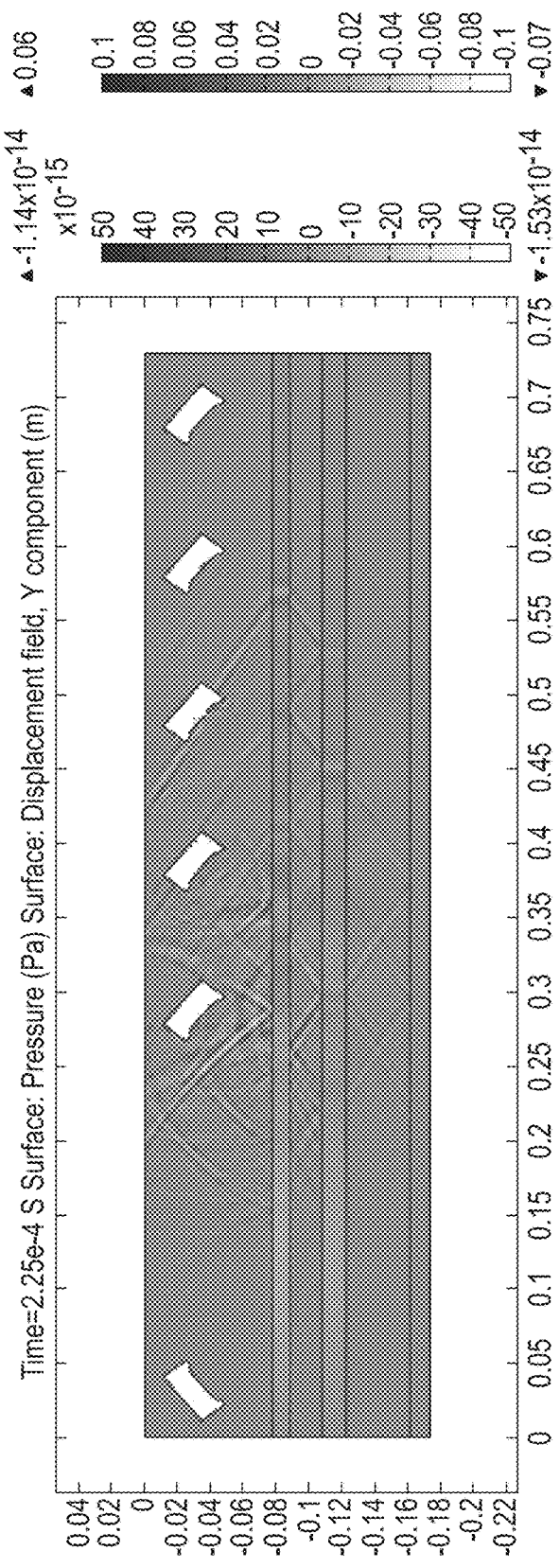
FIG. 10 shows a simulation using the tool of FIG. 9.

FIG. 10 illustrates a simulated wavefield propagation for the proposed system. The model is similar to that of FIGS. 3a to 3h. It will be understood that the third interface echo propagates along the pipe length and hits each of the five receivers in turn. As the third interface echo moves along the pipe it will at first decay, but then rise in amplitude. The simulation has shown that this effect is due to reinforcement of the third interface echo by the addition of reflected and leaked energy from both above and below the second pipe layer 10. Thus, the sequence of flexural waves in the first pipe layer 8 and the second pipe layer 10 each produce headwaves. At some points the headwaves and reflections thereof will reinforce the third interface echo. At other points they will not. This then causes the phenomenon seen in FIG. 4, where the far receiver sees an apparently larger amplitude for the third interface echo than the near receiver.

Figure 11:
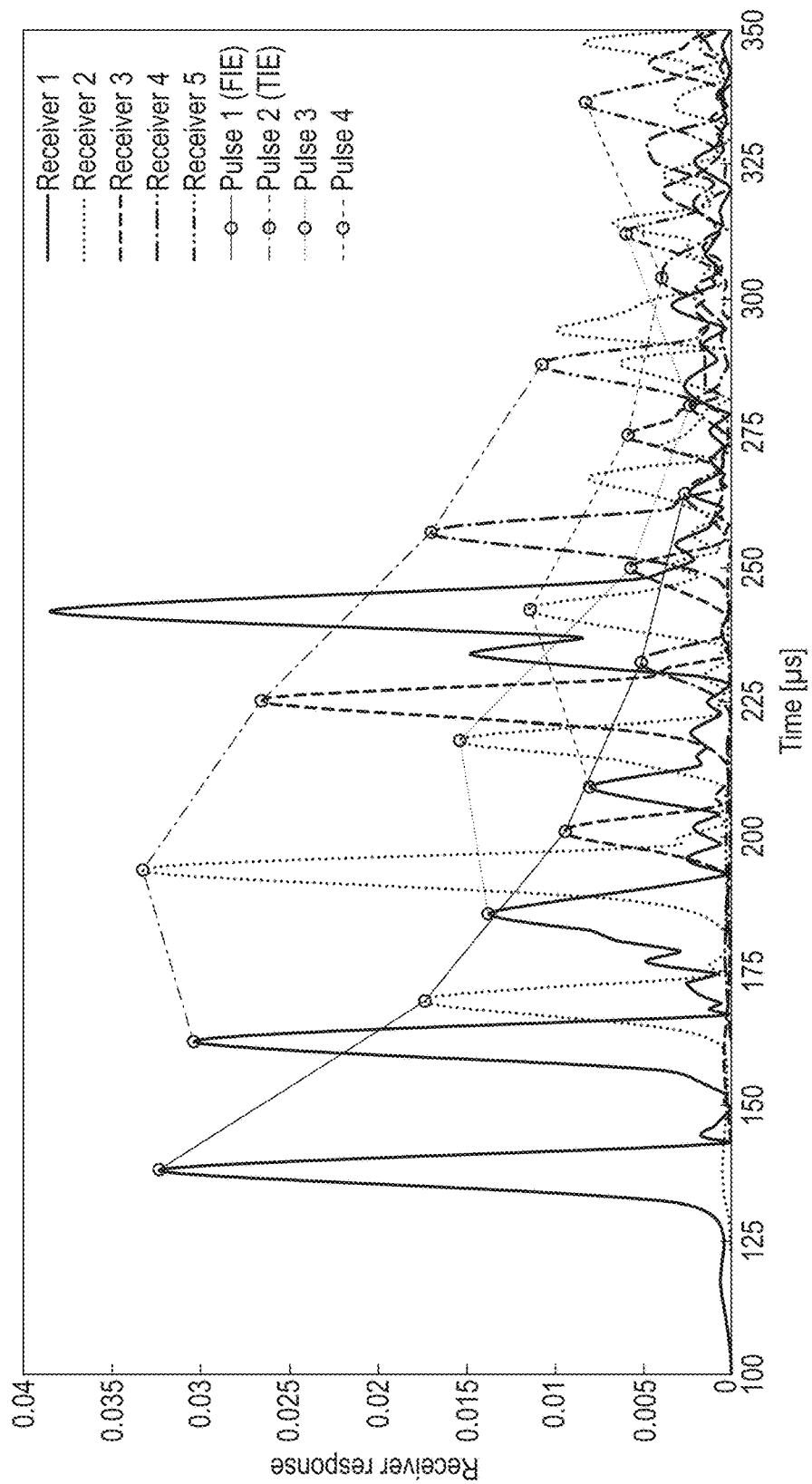
FIG. 11 is a plot of amplitudes received over time at each of the five receivers in the tool of FIGS. 9 and 10

A full set of amplitudes recorded by each of the five receivers over time is shown in FIG. 11. The receivers are numbered 1 to 5 from left to right as viewed in FIGS. 9 and 10 and the peaks corresponding to the various echoes are identified. The first interface echo (FIE) has a decaying amplitude which is typical. The second set of pulses, corresponding to the third interface echo (TIE) first increases in amplitude and then decays, as explained above. The third and fourth pulses are also shown. These arise from headwaves produced by subsequent flexural waves in the two pipe layers. It will be noted that the show similar behaviour to the third interface echo.

Figure 12:
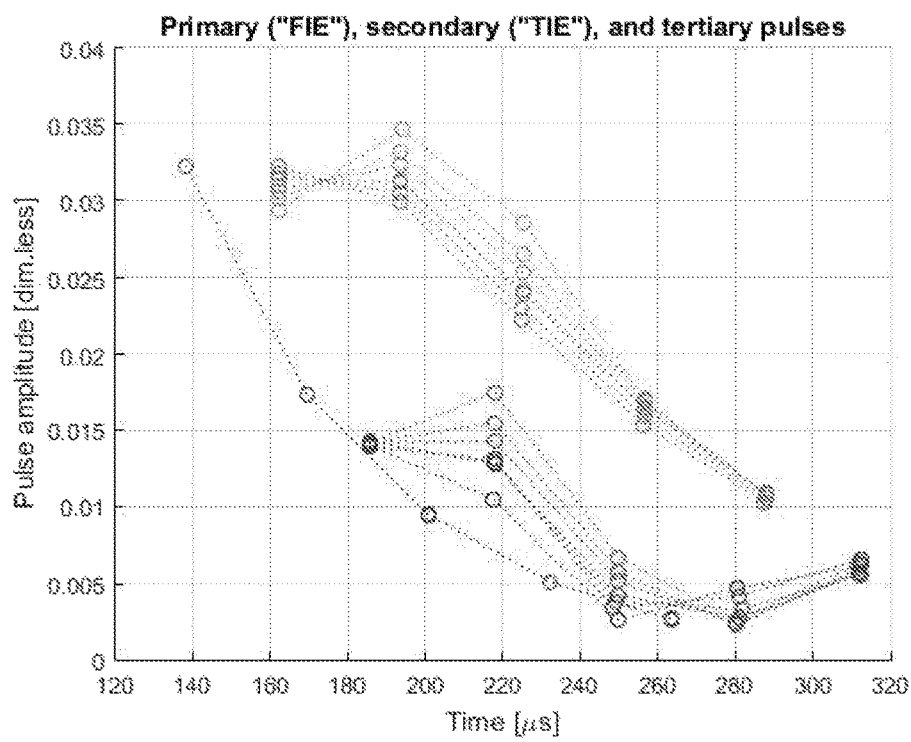
FIG. 12 shows another example of measurements for the first to third pulses measured at five receivers.

FIG. 12 shows another example of measurements for the first to third pulses measured at five receivers for a series of tests at different impedances. In each case it is possible to see the increase in amplitude for the third interface echo (the second pulses), which is the set of plots at the top of the graph. It will be understood that the current logging systems, which would provide just the first two points on the plots, cannot provide the required information about the decay in amplitude for the third interface echo. However, by having at least two receivers spaced far enough from the transmitter to be 'past' the peak in amplitude for the third interface echo pulses it becomes possible to find out the required information. The required receivers could be any combination of the second to fifth receivers in this example.

Figure 13:
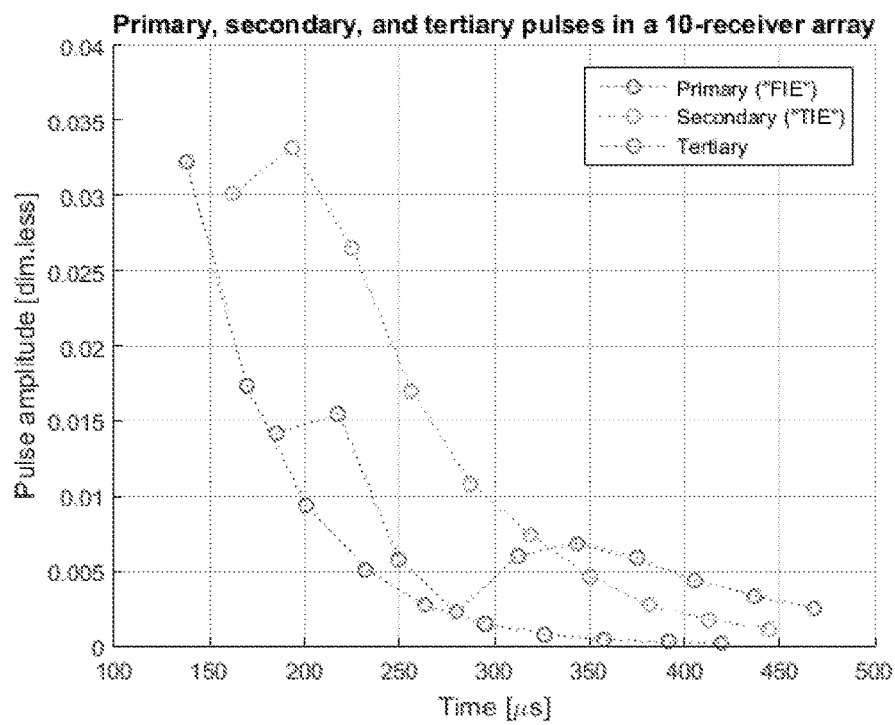
FIG. 13 shows the results from a larger, 10 receiver, array.

FIG. 13 shows the results from a larger, 10 receiver, array, where again it is possible to see the peak in amplitude for the third interface echo data and how the use of additional receivers spaced further apart from the transmitter allows for the exponential decay of the third interface echo to be measured.

It will thus be understood that by the use of receivers including at least two receivers spaced far enough from the transmitter to be 'past' the peak in amplitude for the third interface echo pulses it is possible to obtain knowledge about the amplification effects of the third interface echo and to permit a more accurate characterisation of the second pipe. Using additional receivers (i.e. more than two) provides additional information and greater confidence in the results. This reduces the uncertainty of evaluating the impedance map as described above, since it can become possible to reconstruct the 'normal' exponential decay for the third interface echo (and higher order echoes) by eliminating the focussing effect. Since the attenuation can be determined, or at least approximated, then it is possible to locate which side of the discontinuity is relevant and hence to use the third interface echo data to provide detailed information about the material condition outside of the second pipe layer. The new information adds the possibility applying of more complex processing methods including and not limited to amplitude versus offset, wave field decomposition, and direct velocity estimation behind the second pipe layer.

Thus, by the addition of further receivers, and based on the findings outlined above, the following improvements can be realised:

Elimination of amplification/focussing effects on the recorded data.

Enabling AVO methods for borehole integrity evaluation with ultrasound

Enabling wave field decomposition processing methods for borehole integrity evaluation with ultrasound Enabling full scanning potential for Ultrasonic measurement Allowing determination of full geometry of the wells in terms of pipe position in the wells Support for decisions related to cement operations in between pipes More information about well integrity multiple pipe monitoring Support for decisions on depth of cutting and pulling pipe for P&A Support for decisions on the amount of pipes to be left in the hole Support for decisions on mobilization equipment to the rigs 50% cost reduction for logging operations by not having to remove the inner pipe from the holes Operational decision for buckled pipe removal through BOP's This is achieved without the need for complex and untried components since the basic parts, and indeed the main principles of operation, are the same as the prior art devices. The new system can also provide a shortened delivery time from logging to results, since the processing can be made relatively simple.

The invention claimed is:

1. A logging system for evaluation of a downhole installation, wherein the downhole installation comprises: a first pipe layer, a second pipe layer about the first pipe layer, an annulus between the first pipe layer and the second pipe layer, and a geological formation outside of the second pipe layer, the system comprising:
    a logging tool including an angled acoustic transmitter for exciting a flexural wave in the first pipe layer, and three or more angled acoustic receivers spaced apart along the tool such that, in use, the receivers are at different locations along the length of the pipe layers, the receivers each being for obtaining third interface echo data from the second pipe layer; and
    a processor arranged to process acoustic data from the receivers in order to: identify trends in the amplitude of the third interface echo as it propagates along the length of the pipes, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

2. A logging system as claimed in claim 1, wherein the processor is arranged to identify trends in the amplitude of the third interface echo as it propagates along the length of the pipes by plotting the peaks in amplitude for the third interface echo received at each of the receivers, and fitting a curve to the peaks.

3. A logging system as claimed in claim 2, wherein the processor is arranged to determine an estimated exponential decay curve based on the trends in amplitude, and to use a predicted/estimated attenuation from the estimated exponential decay curve to determine estimated impedance data for the second pipe layer and material outside the second pipe layer.

4. A logging system as claimed claim 1, wherein the logging tool comprises five or more receivers.

5. A logging system as claimed in claim 1, wherein the receivers are equally spaced.

6. A logging system as claimed in claim 5, wherein the receivers are spaced apart by a distance in the range 5-15 cm.

7. A logging system as claimed in claim 1, being a cement bond evaluation system for a downhole installation, wherein the processor is arranged to produce cement bond log data.

8. A downhole installation equipped with the system of claim 1.

9. A method of evaluation of a downhole installation, wherein the downhole installation comprises: a first pipe layer, a second pipe layer about the first pipe layer, an annulus between the first pipe layer and the second pipe layer, and a geological formation outside of the second pipe layer, the method comprising:
    exciting a flexural wave in the first pipe layer using an angled acoustic transmitter; receiving third interface echo data using angled acoustic receivers at different locations along the longitudinal extent of the pipes, the acoustic receivers including at least two receivers spaced apart from the transmitter so as to be located beyond the location where a peak in third interface echo amplitude is expected;
    processing the received acoustic data in order to: identify trends in the amplitude of the third interface echo as it propagates along the length of the pipe layers, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

10. A method as claimed in claim 9, wherein three or more angled acoustic receivers are used.

11. A method as claimed in claim 9, wherein the processing step includes identifying trends in the amplitude of the third interface echo as it propagates along the length of the pipes by plotting the peaks in amplitude for the third interface echo received at each of the receivers, and fitting a curve to the peaks.

12. A method as claimed in claim 9, comprising determining the expected location for the peak in third interface echo amplitude based on simulations and/or experimental data, and placing the angle acoustic receivers based on the determined expected location.

13. A method as claimed in claim 9, being a method of cement bond evaluation for a downhole installation.

14. A computer programme product comprising instructions that, when executed, will configure a computer apparatus to implement a method comprising:
    receiving acoustic data for a downhole installation that comprises: a first pipe layer, a second pipe layer about the first pipe layer, an annulus between the first pipe layer and the second pipe layer, and a geological formation outside of the second pipe layer; wherein the acoustic data comprises third interface echo data received by angled acoustic receivers at different locations along the longitudinal extent of the pipe layers, the acoustic receivers including at least two receivers spaced apart from the transmitter so as to be located beyond the location where a peak in third interface echo amplitude is expected; and processing the received acoustic data in order to: identify trends in the amplitude of the third interface echo as it propagates along the length of the pipe layers, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

15. A logging system for evaluation of a downhole installation, wherein the downhole installation comprises: a first pipe layer, a second pipe layer about the first pipe layer, an annulus between the first pipe layer and the second pipe layer, and a geological formation outside of the second pipe layer, the system comprising:

a logging tool including an angled acoustic transmitter for exciting a flexural wave in the first pipe layer, and angled acoustic receivers spaced apart along the tool such that, in use, the receivers are at different locations along the length of the pipe layers, the acoustic receivers including at least two receivers spaced apart from the transmitter so as to be located beyond the location where a peak in third interface echo amplitude is expected, the receivers each being for obtaining third interface echo data from the second pipe layer; and a processor arranged to process acoustic data from the receivers in order to: identify trends in the amplitude of the third interface echo as it propagates along the length of the pipes, calculate an estimated exponential decay for the third interface echo when reinforcement from other acoustic energy is disregarded, use this estimation to predict if the material behind the second pipe layer is fluid or solid, and analyse the third interface echo data in light of the determined material state in order to thereby evaluate material conditions in the annulus outside the second pipe layer.

* * * * *